United States Patent [19]

Hashimoto et al.

[11] Patent Number: 5,210,116

[45] Date of Patent: May 11, 1993

[54] RESIN COMPOSITE MATERIAL CONTAINING GRAPHITE FIBER

[75] Inventors: Setsujiro Hashimoto, Numazu; Kiyoshi Yagi, both of Gotenba; Masahiro Kanda, all of Shizuoka, all of Japan

[73] Assignee: Yazaki Corporation, Tokyo, Japan

[21] Appl. No.: 681,423

[22] Filed: Apr. 5, 1991

Related U.S. Application Data

[63] Continuation of Ser. No. 298,096, Jan. 18, 1989, abandoned.

[30] Foreign Application Priority Data

Jan. 19, 1988 [JP] Japan ................................. 63-7623

[51] Int. Cl.$^5$ ............................................. C08L 63/00
[52] U.S. Cl. ...................................... 523/468; 523/512; 524/495; 423/447.3; 423/448; 106/472
[58] Field of Search ............... 523/468, 512; 524/495; 106/472; 423/447.3, 448

[56] References Cited

U.S. PATENT DOCUMENTS

| | | | |
|---|---|---|---|
| 4,388,227 | 6/1983 | Kalnin | 106/472 |
| 4,565,684 | 1/1986 | Tibbetts et al. | 423/447.3 |

FOREIGN PATENT DOCUMENTS

| | | | |
|---|---|---|---|
| 60-027700 | 2/1985 | Japan | 423/447.3 |
| 61-119715 | 6/1986 | Japan | 423/447.3 |
| 61-218661 | 9/1986 | Japan . | |
| 61-225320 | 10/1986 | Japan | 423/447.3 |

OTHER PUBLICATIONS

Katz et al., Handbook of Fillers and Reinforcements, 60, Plastics, Van Nortrand Reinhold (1978) pp. 562–582.

Journal of Composite Material, vol. 21, No. 6, Jun. 1987, pp. 580–592; D. A. Jaworske et al: "Mechanical and electrical properties of graphite fiber–epoxy composite made from pristine and bromine intercalated fibers" pp. 581–583: Materials and methods; p. 586, table 5, pp. 590–591: Conclusions.

Patent Abstracts of Japan, vol. 11, No. 60, Feb. 24, 1987; & JP-A-61 218 661 (Asahi Chem. Ind.) Sep. 29, 1986 Abstract.

*Primary Examiner*—Paul R. Michl
*Assistant Examiner*—Edward D. Cain
*Attorney, Agent, or Firm*—Nikaido, Marmelstein, Murray & Oram

[57] ABSTRACT

Provided herein is a resin composite material containing graphite fiber which has good electrical conductivity and changes only a little in electrical resistance after processing. These desired properties are achieved by incorporating a synthetic resin matrix with a specific type of graphite fiber. The graphite fiber has a structure characterized by that the hexagonal network planes of carbon atoms are oriented substantially parallel to the fiber axis and like the annual ring. It is produced by bringing a hydrocarbon compound into contact, at a high temperature, with a metallic catalyst in the form of ultrafine particles to yield carbon fiber grown in the gas phase, and subsequently graphitizing thus obtained carbon fiber.

7 Claims, No Drawings

RESIN COMPOSITE MATERIAL CONTAINING GRAPHITE FIBER

This application is a continuation of application Ser. No. 298,096 filed Jan. 18, 1989 now abandoned.

BACKGROUND OF THE INVENTION

1. Field of the Invention

The present invention relates to a conductive resin composite material suitable for the production of conductive molded articles.

2. Description of the Prior Art

The recent development in electronics technology needs shielding for static charge and electromagnetic waves which is made from a conductive resin composite material composed of a synthetic resin or rubber and carbon particles or fibers, having light weight, high strength, high conductivity, and good moldability. Unfortunately, a conductive resin composite material incorporated with carbon particles such as carbon black has a disadvantage that it needs to contain a large amount of carbon particles if it is to have a low resistance. The carbon particles incorporated in large quantities greatly increase the viscosity of the resin composite material, which leads to poor moldability. An additional disadvantage of the carbon-containing resin composite material is that the structure of carbon black is broken by shear at the time of mixing or molding, which leads to the deviation of resistivity. On the other hand, a conductive resin composite material incorporated with carbon fibers formed from organic fibers such as polyacrylonitrile fibers by the carbonization and subsequent graphitization also has a disadvantage that it does not provide a desired conductivity because carbon fibers themselves are short of conductivity.

In order to overcome these disadvantages, there was proposed in Japanese Patent Laid-open No. 218661/1986 a resin composite material having a low resistance and good moldability, which is formed by incorporating plastics or rubber with carbon fibers 0.05 to 4 $\mu$m in diameter, with an aspect ratio (length-to-diameter ratio) of 20 to 1000, and having a uniform thickness with very few branches. Such carbon fibers are produced by pyrolyzing a hydrocarbon introduced into a reaction zone together with a specific organometallic compound (and, if necessary, a carrier gas). The carbon fibers undergo heat treatment according to need. Even this resin composite material needs a large amount of carbon fiber if it is to have a low resistance. The incorporation of carbon fiber in large quantities adversely affects the formability. In addition, however large the quantity of carbon fiber may be, the resistivity achieved by it is of the order of $10^{-2}$ $\Omega$.cm at the lowest.

SUMMARY OF THE INVENTION

It is an object of the present invention to provide a resin composite material which has good electrical conductivity and changes only a little in electrical resistance after processing. These desired properties are achieved by incorporating a synthetic resin matrix with a specific type of graphite fiber. The gist of the present invention resides in a resin composite material containing graphite fiber which comprises a synthetic resin matrix and an intercalated compound of graphite fiber and bromine, said graphite fiber having a structure characterized in that the hexagonal network planes of carbon atoms are oriented substantially parallel to the fiber axis and like annual rings.

DETAILED DESCRIPTION OF THE INVENTION

The graphite used as a constituent of the composite material of the present invention is obtained in two steps. The first step involves the thermal decomposition of a hydrocarbon in gas phase which yields carbon fiber. The second step involves the heat treatment of the carbon fiber in an atmosphere of inert gas. The hydrocarbon for thermal decomposition includes aromatic hydrocarbons such as toluene, benzene, and naphthalene, and aliphatic hydrocarbons such as propane, ethane, and ethylene. Preferable among them are benzene and naphthalene. The thermal decomposition is performed by bringing a gasified feedstock, together with a carrier gas (such as hydrogen), into contact with a catalyst at 900° to 1500° C. The catalyst is iron, nickel, or iron-nickel alloy etc. in the form of ultrafine particles 100 to 300 Å in diameter which is supported on a ceramics or graphite substrate. Alternatively, the thermal decomposition is performed by brining a gasified feedstock, together with a carrier gas (such as hydrogen), into contact with a catalyst suspended in a reaction zone at 900° to 1500° C. The catalyst is iron, nickel, or iron-nickel alloy etc. in the form of ultrafine particles 100 to 300 Å in diameter.

The carbon fiber obtained in this manner is ground using an adequate grinding machine or crusher such as ball mill, rotor speed mill, and cutting mill, if necessary. This crushing is not a must but desirable because the crushed carbon fiber forms an intercalated compound easily and disperses readily into a resin matrix.

The ground carbon fiber is subsequently heated in an atmosphere of inert gas such as argon at 1500° to 3500° C., preferably 2500° to 3000° C., for 10 to 120 minutes, preferably 30 to 60 minutes. This heat treatment yields graphite fiber having a crystal structure characterized in that the hexagonal network planes of carbon atoms are oriented substantially parallel to the fiber axis and like annual rings. With a heating temperature lower than 1500° C., the heat treatment does not fully develop the crystal structure of carbon atoms. Conversely, with a heating temperature higher than 3500° C., the heat treatment does not produce any additional effect and hence it is uneconomical. With a heating time shorter than 10 minutes, the heat treatment does not uniformly develop the crystal structure of carbon atoms. Conversely, with a heating time longer than 120 minutes, the heat treatment does not produce any additional effect.

In the subsequent step, the graphite fiber is treated with bromine at 0° to 50° C. for 10 minutes or more. The bromine used for this purpose should have as high a concentration as possible, preferably 99% or higher, free of water. The bromine may be in the form of liquid or vapor when brought into contact with graphite fiber. In the case of liquid bromine, the bromine treatment may be accomplished by dipping the graphite fiber into bromine. The liquid bromine used in this manner should be free of impurities, because impurities would prevent bromine from infiltrating and diffusing into the space between the lattice plane of graphite crystal or impurities themselves get into the space between the lattice plane of graphite crystal. This holds true also in the case where bromine is used in vapor form. An advantage of using bromine vapor is that nonvolatile impurities are removed by vaporization and this eases restrictions on the purity and form of the bromine vapor source.

The graphite fiber should be brought into contact with bromine at 0° to 50° C., preferably 5° to 30° C. If the temperature is excessively low, it takes a long time for bromine to diffuse into the space between the lattice plane of graphite crystal and the temperature control is difficult. If the temperature is excessively high, the handling of bromine is difficult and the graphite fiber is liable to break or lose mechanical strength.

The graphite fiber should be kept in contact with bromine for at least 10 minutes, preferably 30 minutes to 72 hours. Contacting for less than 10 minutes does not permit effective time control and hence results in quality variation. In addition, the reduction of contacting time does not produce any economical effect.

The bromine-treated graphite fiber thus obtained is finally uniformly incorporated into a synthetic resin or rubber. Among the synthetic resins that can be used in the present invention are thermoplastic resins such as polyethylene, polypropylene, polyvinyl chloride, ethylenevinyl acetate copolymer, and ethylene-acrylic ester copolymer etc., and thermosetting resins such as silicone resin, phenolic resin, urea resin, and epoxy resin etc. Among the synthetic rubbers that can be used in the present invention are chloroprene, chlorosulfonated polyethylene, chlorinated polyethylene, ethylene-α-olefin rubber, ethylene-propylene rubber, silicone rubber, acrylic rubber, and fluororubber etc.

The dispersion of bromine-treated graphite fiber into the synthetic resin or rubber may be accomplished by using an ordinary mixing machine such as two-roll mixer, kneader, internal mixer, and Banbury mixer. The amount of the bromine-treated graphite fiber is not specifically limited; but it should be in the range of 5 to 200 parts by weight, preferably 10 to 100 parts by weight, for 100 parts by weight of the synthetic resin or rubber from the standpoint of electrical resistivity, processability, and moldability.

The thus obtained composite material can be formed into a desired shape by extrusion, injection molding, transfer molding, or press molding etc., which are properly selected according to the base resin of the composite material and the shape of the molded article. The base resin of the composite material may be incorporated with additives such as filler, processing aid, antioxidant, and cross-linking agent.

EXAMPLES

The invention will be described in more detail with reference to the following examples, which are intended to restrict the scope of the invention.

REFERENTIAL EXAMPLE 1

Carbon fiber, 2 to 10 mm long and 10 to 50 $\mu$m in diameter, was prepared by the thermal decomposition of benzene (introduced together with hydrogen) at 1000° to 1100° C. in a horizontal tubular electric furnace containing a metallic iron catalyst 100 to 300 Å in diameter supported on a mullite ceramics plate. This carbon fiber was crushed using a satellite ball mill (Model P-5 provided by Fritsch Japan Co., Ltd.) for 20 minutes at 500 rpm.

The ground carbon fiber was graphitized by heating at 2960° to 3000° C. for 30 minutes in an electric furnace with an argon atmosphere. The resulting fiber was examined by X-ray diffratometry and observed under an electron microscope. It was found to have a crystal structure characterized by that the hexagonal network planes of carbon atoms are oriented substantially parallel to the fiber axis and like the annual ring. It was also found to have a length of 70 to 100 $\mu$m.

The graphite fiber was placed in a glass container, into which was poured bromine. With the glass container tightly stoppered, the graphite fiber and bromine were allowed to stand at 23° C. for 48 hours. Thus there was obtained bromine-treated graphite fiber (A).

REFERENTIAL EXAMPLE 2

Carbon fiber, 10 to 1000 $\mu$m long and 0 1 to 0.5 $\mu$m in diameter, was prepared by the thermal decomposition of benzene (introduced together with hydrogen) at 1000° to 1100° C. in a vertical tubular electric furnace containing a metallic iron catalyst powder 100 to 300 Å in diameter suspended by an upward hydrogen stream. This carbon fiber was ground and then graphitized in the same manner as in Referential Example 1. The thus obtained graphite fiber was examined by X-ray diffratometry and observed under an electron microscope. It was found to have a crystal structure characterized in that the carbon hexagonal network face is substantially parallel with the axis of the fibers and is oriented coaxially. It was also found to have a length of 3 to 5 $\mu$m.

The graphite fiber was treated with bromine in the same manner as in Referential Example 1. Thus there was obtained bromine-treated graphite fiber (B).

EXAMPLE 1

Each of bromine-treated graphite fiber (A) and (B) obtained in Referential Examples 1 and 2, respectively, was mixed with low-density polyethylene ("Mirason 3530" provided by Mitsui Petrochemical Co., Ltd.) at a ratio of 20 or 40 parts by weight to 100 parts by weight, at 140° to 150° C. for 30 minutes, using a 6-inch roll.

The resulting composition was press-formed into a sheet, 70 mm long, 10 mm wide, and 1 mm thick. The specimen, with both edges 10 mm wide coated with a conductive silver paint, was examined for electrical resistivity using a Wheatstone bridge method. The composition containing 40 parts by weight of bromine-treated graphite fiber for 100 parts by weight of low-density polyethylene was pelletized using a pelletizer, and the pellets were extruded to form a 0.5 mm thick coating on a radiation-crosslinked polyethylene-coated electric wire using a 20 mm type extruder at 200° to 250° C., so as to evaluate the formability.

For the purpose of comparison, three kinds of composite materials were prepared in the same manner as above except that the bromine-treated graphite fiber was replaced by conductive carbon black ("Ketjenblack EC" provided by Lion Akzo Co., Ltd.), PAN-based carbon fiber ("Milled Fiber MLD-30" provided by Toray Industries, Inc.), or bromine-free graphite fiber (C) prepared by Referential Example 1. The specimens were examined for resistivity. The results are shown in Table 1.

The extrusion formability of the composite materials numbered 2, 4, 6, 8, and 10 in Table 1 was evaluated. The results are shown in Table 2.

It is noted from Tables 1 and 2 that the composite materials pertaining to the present invention have a very low resistivity and outstanding formability.

TABLE 1

| Component | \multicolumn{10}{c}{(Formulation, parts by weight)} |
|---|---|---|---|---|---|---|---|---|---|---|
| | 1 | 2 | 3 | 4 | 5* | 6* | 7* | 8* | 9* | 10* |
| Synthetic resin | 100 | 100 | 100 | 100 | 100 | 100 | 100 | 100 | 100 | 100 |
| Graphite fiber (A) | 20 | 40 | — | — | — | — | — | — | — | — |
| Graphite fiber (B) | — | — | 20 | 40 | — | — | — | — | — | — |
| Graphite fiber (C) | — | — | — | — | 20 | 40 | — | — | — | — |
| Carbon black | — | — | — | — | — | — | 20 | 40 | — | — |
| Carbon fiber | — | — | — | — | — | — | — | — | 20 | 40 |
| Resistivity, Ω · cm | 1.4 | 0.018 | 1.8 | 0.032 | 6.8 | 0.24 | 34.5 | 4.6 | 49.8 | 11.3 |

*Comparative Examples

TABLE 2

| No. | Results |
|---|---|
| 2 | Permitted continuous operation for 4 hours without any trouble. Gave a coating with a good appearance. |
| 4 | Permitted continuous operation for 4 hours without any trouble. Gave a coating with a good appearance. |
| 6* | Permitted continuous operation for 4 hours without any trouble. Gave a coating with a good appearance. |
| 8* | Gave a coating thicker than 0.5 mm owing to increase in melt viscosity. |
| 10* | Gave a 0.5-mm thick coating, at the sacrifice of a smooth surface. |

*Comparative Examples

EXAMPLE 2

A resin composite material was prepared from 100 parts by weight of epoxy resin ("Epikote 828" provided by Yuka Shell Epoxy Co., Ltd.), 110 parts by weight of acid anhydride hardener ("Epicure YH-307" provided by Yuka Shell Epoxy Co., Ltd.), 1 part by weight of hardening accelerator ("Epicure EMI-24" provided by Yuka Shell Epoxy Co., Ltd.), 50 or 100 parts by weight of bromine-treated graphite fiber (A) or (B) obtained in Referential Example 1 or 2, respectively. The resin composite material was made into a dumbbell specimen (conforming to JIS K-6301, No. 4) by transfer molding, with curing at 80° C. for 3 hours.

The mixing of the components was performed as follows: At first, the epoxy resin was placed in a mixing pot and then the graphite fiber was added. They were mixed for 60 minutes, and the resulting mixture was passed through a three-roll type mill five times. To the milled mixture were added the hardener and hardening accelerator, and the resulting mixture was passed through a three-roll type mill five times. The thus obtained composite material was finally fed to a transfer molding machine.

The specimens were examined for resistivity and the moldability of the composite material was evaluated. The results are shown in Table 3.

For the purpose of comparison, four kinds of composite materials were prepared in the same manner as above except that the bromine-treated graphite fiber was replaced by bromine-free graphite fiber (C) or PAN-based carbon fiber. The composite materials were evaluated in the same manner as above. The results are shown in Table 3.

It is noted from Table 3 that the composite material pertaining to the present invention has a very low resistivity and outstanding moldability.

TABLE 3

| | \multicolumn{8}{c}{(Formulation, parts by weight)} |
|---|---|---|---|---|---|---|---|---|
| | \multicolumn{8}{c}{No. of composite materials} |
| Component | 11 | 12 | 13 | 14 | 15* | 16* | 17* | 18* |
| Graphite fiber (A) | 50 | 100 | — | — | — | — | — | — |
| Graphite fiber (B) | — | — | 50 | 100 | — | — | — | — |
| Graphite fiber (C) | — | — | — | — | 50 | 100 | — | — |
| Carbon fiber | — | — | — | — | — | — | 50 | 100 |
| Resistivity, Ω · cm | 0.074 | 0.0079 | 0.093 | 0.0092 | 0.43 | 0.098 | 1.43 | 0.83 |
| Moldability | Good | Good | Good | Good | Good | Good | Fair** | Fair** |

*Comparative Examples
**with a rough surface

EXAMPLE 3

A coating material containing 25% solids was prepared from 100 parts by weight of chlorosulfonated polyethylene ("Hypalon 45" provided by DuPont) and 50 parts by weight of bromine-treated graphite fiber (A) or (B) obtained in Referential Example 1 or 2, respectively. The components were kneaded by using a two-roll type mill and then a mixing machine. The mixture was further mixed in a mixing pot with toluene for 48 hours. During mixing, 2.5 parts by weight of antioxidant was added.

For the purpose of comparison, two kinds of coating materials were prepared in the same manner as above except that the bromine-treated graphite fiber was replaced by bromine-free graphite fiber (C) or PAN-based carbon fiber.

The coating material was applied to a polyester film to form a thin coating film. The resistivity of the thin coating film was measured by the aid of blade electrodes pressed against the thin coating film. The results are shown in Table 4.

It is noted from Table 4 that the coating material pertaining to the present invention has a very low resistivity.

TABLE 4

| | \multicolumn{4}{c}{(Formulation, parts by weight)} |
|---|---|---|---|---|
| | \multicolumn{4}{c}{No. of composite materials} |
| Component | 19 | 20 | 21* | 22* |
| Graphite fiber (A) | 50 | — | — | — |
| Graphite fiber (B) | — | 50 | — | — |
| Graphite fiber (C) | — | — | 50 | — |
| Carbon fiber | — | — | — | 50 |
| Resistivity, Ω · cm | 0.034 | 0.059 | 0.68 | 1.92 |

*Comparative Examples

As mentioned above, the resin composite material containing graphite fiber of the present invention has a low resistivity and outstanding processability and moldability owing to the bromine-treated graphite fiber in which is formed an intercalated compound. According to the present invention, it is possible to produce a composite material of stable, high quality.

What is claimed is:

1. A resin composite material containing graphite fibers which comprises a synthetic resin matrix and fibers which are an intercalated compound of graphite fiber and bromine, wherein said graphite fiber comprises a hexagonal network of planes of carbon atoms which are oriented substantially parallel to the axis of the fibers like annual rings.

2. A resin composite material containing graphite fiber according to claim 1, wherein the graphite fiber is one which is produced by bringing a hydrocarbon compound into contact, at a high temperature, with a metallic catalyst in the form of ultrafine particles supported on a substrate to yield carbon fiber grown in the gas phase, and subsequently graphitizing thus obtained carbon fiber.

3. A resin composite material containing graphite fiber according to claim 1, wherein the graphite fiber is one which is produced by bringing a hydrocarbon compound into contact with a metallic catalyst in the form of ultrafine particles suspended in a high-temperature zone to yield carbon fiber grown in the gas phase, and subsequently graphitizing thus obtained carbon fiber.

4. A composite material according to claim 2 or 3, wherein the metallic catalyst is one which is selected from iron, nickel, and iron-nickel alloy.

5. A composite material according to claims 2 or 3, wherein the metallic catalyst is one which has a particle diameter of 100 to 300 Å.

6. A composite material according to claims 2 or 3, wherein the hydrocarbon is brought into contact with the metallic catalyst at 900° to 1500° C.

7. A composite material according to claims 2 or 3, wherein the carbon fiber is graphitized at 1500° to 3500° C. for 10 to 120 minutes.

* * * * *